United States Patent
Laganière et al.

(10) Patent No.: US 12,118,795 B2
(45) Date of Patent: Oct. 15, 2024

(54) SYSTEM AND METHOD FOR TRACKING CUSTOMER MOVEMENTS IN A CUSTOMER SERVICE ENVIRONMENT

(71) Applicants: Robert Laganière, Gatineau (CA); Andrés Solís Montero, Ottawa (CA); Luis E. Gurrieri, Kanata (CA)

(72) Inventors: Robert Laganière, Gatineau (CA); Andrés Solís Montero, Ottawa (CA); Luis E. Gurrieri, Kanata (CA)

(73) Assignee: TEMPO ANALYTICS INC. (CA)

( * ) Notice: Subject to any disclaimer, the term of this patent is extended or adjusted under 35 U.S.C. 154(b) by 616 days.

(21) Appl. No.: 17/260,802

(22) PCT Filed: Jul. 18, 2018

(86) PCT No.: PCT/CA2018/050870
§ 371 (c)(1),
(2) Date: Jan. 15, 2021

(87) PCT Pub. No.: WO2020/014766
PCT Pub. Date: Jan. 23, 2020

(65) Prior Publication Data
US 2021/0166041 A1    Jun. 3, 2021

(51) Int. Cl.
*G06V 20/52* (2022.01)
*G06Q 20/40* (2012.01)
(Continued)

(52) U.S. Cl.
CPC .............. *G06V 20/53* (2022.01); *G06T 7/194* (2017.01); *G06T 7/246* (2017.01); *G06T 7/292* (2017.01);
(Continued)

(58) Field of Classification Search
CPC ......... G06T 7/194; G06T 7/246; G06T 7/292; G06T 2207/30232; G06T 2207/30201;
(Continued)

(56) References Cited

U.S. PATENT DOCUMENTS

| | | |
|---|---|---|
| 8,818,034 B2 | 8/2014 | Zhang et al. |
| 9,180,887 B2 | 11/2015 | Nemat-Nasser et al. |

(Continued)

OTHER PUBLICATIONS

Bazzani, L. et al. "Symmetry-Driven Accumulation of Local Features for Human Characterization and Re-identification", Computer Vision and Image Understanding (CVIU), Nov. 2012. 17 Pages.
(Continued)

*Primary Examiner* — Kenny A Cese
(74) *Attorney, Agent, or Firm* — McDonald Hopkins LLC

(57) ABSTRACT

System and methods for tracking transaction flow through a customer service area. The present invention provides automated, non-intrusive tracking of individuals, based on a series of still image frames obtained from one or more colour sensors. Images of individuals are extracted from each frame and the datasets resulting from the cropped images are compared across multiple frames. The datasets are grouped together into groups called "tracklets", which can be further merged into "customer sets". Various pieces of metadata related to individuals' movement (such as customer location and the duration of each transaction state) can be derived from the customer sets. Additionally, individual images may be anonymized into mathematical representations.

10 Claims, 11 Drawing Sheets

(51) Int. Cl.
*G06Q 50/12* (2012.01)
*G06T 7/194* (2017.01)
*G06T 7/246* (2017.01)
*G06T 7/292* (2017.01)
*G06V 40/10* (2022.01)

(52) U.S. Cl.
CPC ......... *G06V 40/10* (2022.01); *G06Q 20/4015* (2020.05); *G06Q 50/12* (2013.01)

(58) Field of Classification Search
CPC ........... G06T 2207/10016; G06T 2207/30241; G06V 40/10; G06V 20/53; G06V 20/52; G06Q 30/0201; G06Q 20/4015; G06Q 50/12

See application file for complete search history.

(56) References Cited

U.S. PATENT DOCUMENTS

| | | | |
|---|---|---|---|
| 10,095,954 B1 * | 10/2018 | Daliyot | G06T 7/292 |
| 10,217,120 B1 * | 2/2019 | Shin | G06Q 30/0201 |
| 11,205,270 B1 * | 12/2021 | Asmi | G06T 7/90 |
| 2009/0245573 A1 * | 10/2009 | Saptharishi | H04N 23/631 |
| | | | 382/103 |
| 2009/0304229 A1 * | 12/2009 | Hampapur | G06V 20/52 |
| | | | 382/103 |
| 2011/0135154 A1 * | 6/2011 | Wedge | G06T 7/292 |
| | | | 382/103 |
| 2014/0207810 A1 * | 7/2014 | Paglieroni | G06F 16/283 |
| | | | 707/758 |
| 2015/0019161 A1 * | 1/2015 | Moriguchi | G01S 5/0294 |
| | | | 702/150 |
| 2017/0351907 A1 | 12/2017 | Bataller et al. | |

OTHER PUBLICATIONS

Liao S. et al., "Person Re-identification by Local Maximal Occurrence Representation and Metric Learning", CVPR2015. 10 Pages.
International Search Report and Written Opinion mailed Mar. 21, 2019; International Patent Application No. PCT/CA2018/050870 filed on Jul. 18, 2018.

* cited by examiner

SYSTEM AND METHOD FOR TRACKING CUSTOMER MOVEMENTS IN A CUSTOMER SERVICE ENVIRONMENT

CROSS-REFERENCE TO RELATED APPLICATION

This application is a 35 U.S.C. 371 national stage filing of PCT Application No. PCT/CA2018/050870 filed on Jul. 18, 2018, entitled "SYSTEM AND METHOD FOR TRACKING CUSTOMER MOVEMENTS IN A CUSTOMER SERVICE ENVIRONMENT," which is incorporated by reference herein in its entirety.

TECHNICAL FIELD

The present invention relates to customer service delivery. More specifically, the present invention relates to tracking the movement of customers through a service outlet.

BACKGROUND

Those in the Quick-Service Restaurant (QSR) industry seek to differentiate themselves on several axes: cuisine, quality of food, price, facilities, and customer service. Most restaurants in the QSR industry serve customers that physically enter the restaurant and seek service at a front counter. Understanding how customers move through a particular restaurant outlet is critical to understanding customer service quality at that outlet and potential areas for improvement. For instance, if customers must wait in long lines before ordering their meals, they may choose to leave the restaurant without ordering. Similarly, if pre-ordering lines move swiftly but there are delays while customers wait for their meals, they may not return to that restaurant in future.

Tracking customer motion within a QSR, however, typically requires an employee standing near the front counter and manually gathering data. Though some automatic methods exist, they are not yet able to produce data as accurate as that gathered by humans with stopwatches. Nevertheless, the manual method has a number of drawbacks. First, it is not economical to dedicate a QSR employee solely to data-gathering at all times. Also, there are multiple important states in a QSR transaction, including waiting to order, ordering, and waiting after ordering, and it would be impractical for a single employee to gather data on all states at once. Similarly, many restaurants have multiple service points at the front counter, requiring multiple employees to gather data during peak sales hours. Further, the presence of human data-gatherers may discourage some customers from remaining in the restaurant, or otherwise distort the typical transaction flow. Relatedly, the manual method is susceptible to human error.

As a result, there is a need for systems and methods for tracking multiple variables related to customer service and for tracking customer motion through a service outlet. Preferably, such systems and methods should provide management and efficiency experts with data that can be used to develop and/or improve customer service. Additionally, such systems and methods should be suitable not just for QSR outlets but at other establishments that provide service to customers.

SUMMARY

The present invention provides a system and methods for tracking transaction flow through a customer service area. The present invention provides automated, non-intrusive tracking of individuals, based on a series of still image frames obtained from one or more colour sensors. Images of individuals are extracted from each frame and the datasets resulting from the cropped images are compared across multiple frames. The datasets are grouped together into groups called "tracklets", which can be further grouped into "customer sets". Various pieces of tracking-related metadata related to individuals' movement (such as customer location and the duration of each transaction state) can be derived from the customer sets. Additionally, individual images may be anonymized into mathematical representations, such as numeric vectors.

In a first aspect, the present invention provides a system for detecting individuals within image frames and tracking individuals between said image frames, said system comprising:
a processor, said processor receiving an image frame;
a server; and
a database, said database storing datasets, tracklets, and customer sets related to said individuals, each of said tracklets comprising at least one dataset, and each of said customer sets comprising at least one tracklet, and said database also storing metadata related to said individuals,
wherein said processor processes said image frame and isolates at least one individual's image from said image frame;
and wherein said processor generates a descriptor for each said image;
and wherein said server receives a dataset including said descriptor and compares said dataset to a plurality of other datasets;
and wherein said server calculates a similarity score between said dataset and each of said plurality of other datasets, producing a plurality of similarity scores.

In a second aspect, the present invention provides a method of isolating an individual's image from an image frame, the method comprising the steps of:
(a) recognizing at least a part of said individual, based on predetermined image pattern data;
(b) defining a rectangle around said part; and
(c) cropping said image frame to said rectangle.

In a third aspect, the present invention provides a method of tracking an individual between multiple image frames, the method comprising the steps of:
(a) receiving a dataset based on each image frame, said dataset including a descriptor;
(b) comparing said dataset with each of a plurality of other datasets;
(c) adding said dataset to a tracklet based on the results of comparing in step (b), wherein each tracklet comprises at least one descriptor;
(d) comparing each tracklet created in step (d) to other tracklets; and
(e) merging each tracklet with a customer set, based on the results of comparing in step (d), wherein each customer set comprises at least one tracklet.

In a fourth aspect, the present invention provides non-transitory computer-readable media having encoded thereon computer-readable and computer-executable instructions, which, when executed, implement a method for tracking an individual between multiple image frames, the method comprising the steps of:
(a) receiving a dataset based on each image frame, said dataset including a descriptor;

(b) comparing said dataset with each of a plurality of other datasets;
(c) adding said dataset to a tracklet based on the results of comparing in step (b), wherein each tracklet comprises at least one descriptor;
(d) comparing each tracklet created in step (d) to other tracklets; and
(e) merging each tracklet with a customer set, based on the results of comparing in step (d), wherein each customer set comprises at least one tracklet.

BRIEF DESCRIPTION OF THE DRAWINGS

The present invention will now be described by reference to the following figures, in which identical reference numerals refer to identical elements and in which.

DETAILED DESCRIPTION

The present invention provides automatic and anonymized tracking of customer movement within a QSR outlet or a similar service outlet, using cameras to gather data and consistent mathematical representations to analyze customer motions and waiting times. The tracking may be performed in real-time, or at a later time using stored data.

Figure 1:
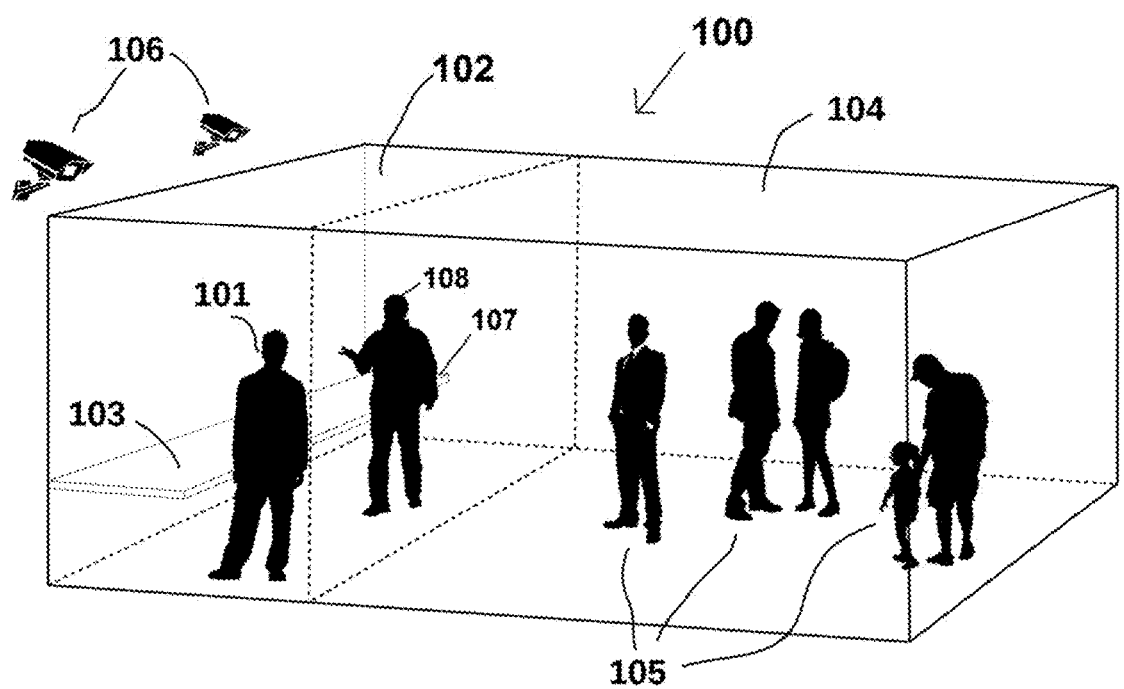
FIG. 1 is a schematic diagram of a service area.

FIG. 1 illustrates a typical QSR outlet with a service area 100. The service area 100 can be divided into subareas: for example, a counter area 102 and a waiting area 104. In some outlet arrangements, the counter area 102 is close to the service counter 103, while the waiting area 104 is close to the back of the counter area 102. It should be clear that other outlet designs are possible. In the example in FIG. 1, customers 105 are waiting in line in the waiting area 104, while a customer receiving service 101 is in the counter area 102.

Multiple colour sensors 106 cover areas 102 and 104 simultaneously. These colour sensors 106 are preferably colour video cameras, and their video streams (sequences of colour image frames) are used for customer detection and tracking. Customers entering a monitored area may appear in the field of one or more video cameras at the same time. Additionally, multiple types of camera may be used simultaneously. For example, a monitored area may have cameras with various image resolutions, fields-of-view, and various sampling speeds (image frame-rates). However, the detection method relies on sensors operating in RGB (Red-Green-Blue) colour space or in any other multi-channel colour space (such as HSV, Hue-Saturation-Value). Additionally, the sensors should have sampling speeds that are sufficient to track natural movement without gaps: for instance, people changing their pose with respect to the camera, or walking about the service area at maximum speed. In most cases, five image frames per second is the minimum frame rate to reliably track people.

In the FIG. 1 example, further, a portion of the service counter 103 is a pickup area 107. Customer 108 is waiting at the pickup area 107. It should be evident that, though the pickup area 107 can be connected or near to the service counter 103 (as shown), the pickup area 107 and the service counter 103 can also be relatively remote from each other within the service area 100.

Figure 2:
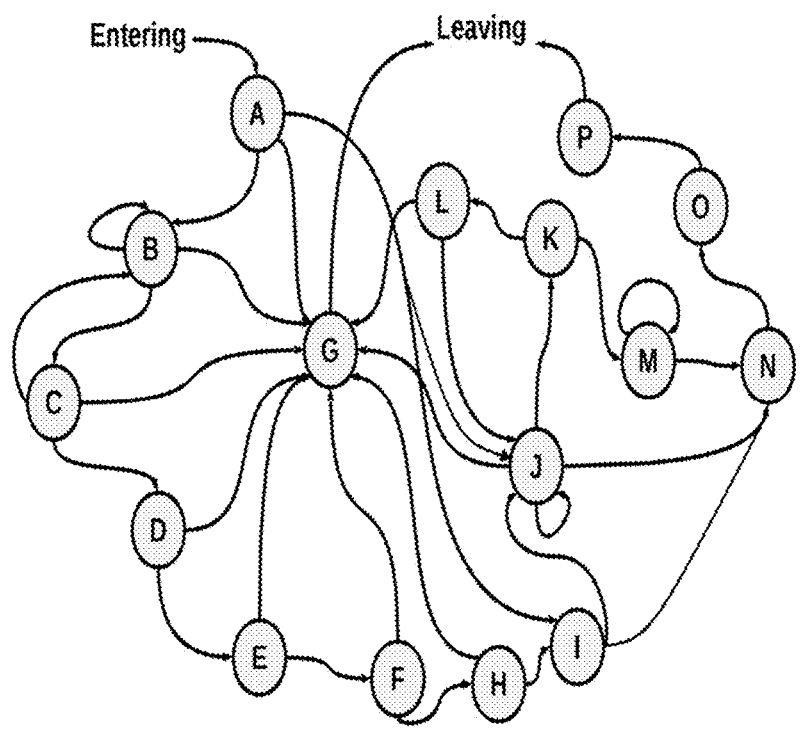
FIG. 2 is a graph of potential transaction states and potential flows between them.

FIG. 2 is a schematic diagram illustrating the possible states in which customers can be, while moving through a QSR outlet, and the potential flow between each state. The possible states are as follows:
(A) Entering the service area (100 in FIG. 1);
(B) Waiting in line;
(C) Moving in the waiting line;
(D) Moving to the service counter 103;
(E) Placing an order;
(F) Paying for the order;
(G) Leaving the service counter without being served;
(H) Moving away from the service counter 103;
(I) Moving to a pickup area 107 to wait for the order;
(J) Waiting for the order away from the pickup area 107;
(K) Moving towards the pickup area 107;
(L) Moving away from the pickup area 107;
(M) Moving to the pickup area 107 when called;
(N) Picking up the order;
(O) Moving away from the pickup area 107 with the order; and
(P) Moving away from the service area 100 after being served.

As can be seen, these states may be inter-related. For instance, a customer entering the service area 100 (state A) may enter the waiting line (state B), leave the service area 100 without being served (state G), or go directly to the pickup area, as in the case of a pre-arranged take-out order (states I or J). Any of these states and any combination of these states, may be tracked by the present invention.

Each active customer can thus be assigned a specific sequential state value, according to their current transaction state. These state values can be correlated with time stamps of gathered images or with other sequencing data, and thus a length of time for each transaction state may be determined. This time-per-state information can be used to track the flow of customers within the service outlet.

Figure 3A:
FIG. 3A is an exemplary image frame captured by a colour sensor in a customer service area.

FIGS. 3A-3F illustrate the idea of tracking a single customer across various states in a service area. In FIG. 3A, many customers are isolated from a single image frame. Each customer will be represented by a corresponding dataset; thus, an image frame with several customers will correspond to several datasets.

Figure 3B:
FIG. 3B is another exemplary image frame captured by a colour sensor in a customer service area.
Figure 3C:
FIG. 3C is another exemplary image frame captured by a colour sensor in a customer service area.
Figure 3D:
FIG. 3D is another exemplary image frame captured by a colour sensor in a customer service area.
Figure 3E:
FIG. 3E is another exemplary image frame captured by a colour sensor in a customer service area.
Figure 3F:
FIG. 3F is another exemplary image frame captured by a colour sensor in a customer service area.

One isolated customer is shown in FIGS. 3B and 3C. The specific customer has moved forward in the waiting line and is closer to the service counter 103 than they were in FIG. 3A. Through FIGS. 3D, 3E, and 3F, the specific customer has moved across the service counter. This specific customer is in different transaction states (as described in FIG. 2, and above) in these different images. As an example, the customer is waiting in FIG. 3A (state B) and is ordering in FIGS. 3C and 3D (state E). The customer may then be paying for their purchase in FIG. 3F (state F).

Figure 4:
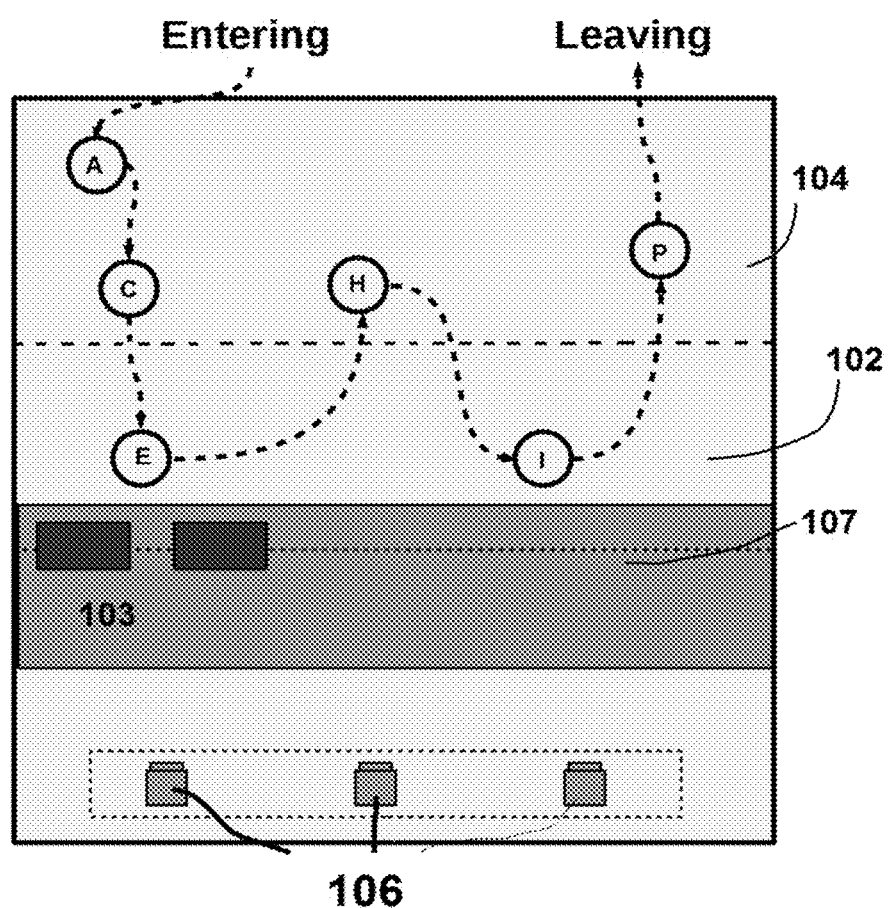
FIG. 4 shows an exemplary transaction flow through a customer service area.

FIG. 4 illustrates a typical transaction flow for a customer in a quick-service type restaurant using the present invention. In this example, the customer transitions from state (A) (entering the service area 100) to state (C), moving in a waiting line to receive service. The customer then transitions to state (E): that is, placing an order at the service counter 103. The customer then moves to state (H), walking away from the service counter 103 and moves to the pickup area 107, waiting at the pickup area 107 to pick up the order when it is ready (state I). Once the order is picked up, the customer transitions to state (P), walking away from the service area after being served. The illustrated flow here is a simple flow path; however, as FIG. 2 demonstrates, more complicated paths are possible.

As may be imagined, other businesses relying on service counters, (e.g., bank service lines) may have different state graphs, where each state is associated with different actions (such as waiting for an available bank teller or discussing a transaction).

Figure 5:
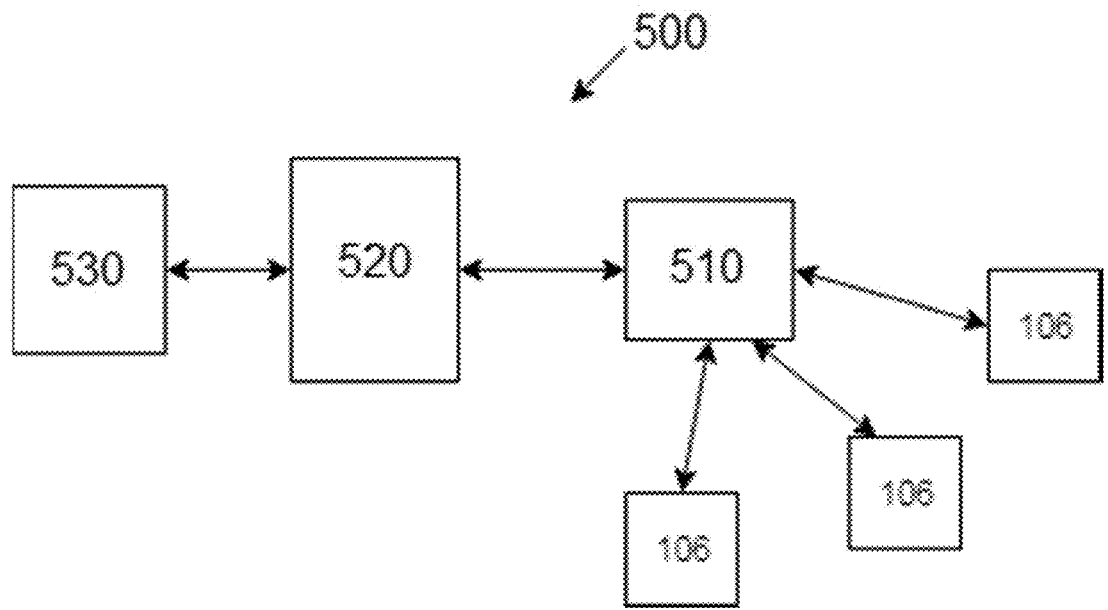
FIG. 5 is a block diagram of the system of the invention according to one embodiment.

FIG. 5 is a block diagram of a system 500 according to one aspect of the invention. A processor 510 communicates with multiple colour sensors 106 and receives images from the colour sensors 106 (as a time-sequenced series of still image frames). The processor 510 isolates individuals' images from the received frames. The processor 510 also generates descriptors for the isolated images. Each descriptor includes several pieces of image-identifying data.

The processor 510 then passes datasets containing the generated descriptors to a server 520. The server 520 performs further operations on the generated datasets, matching newly received datasets with pre-existing datasets where possible. Each unified dataset represents a single customer. The mechanisms by which new datasets are matched with existing datasets will be described in more detail below.

The server 520 is also in communication with a database 530. The database 530 stores descriptors, datasets, "tracklets" (dataset groupings comprising at least one dataset each), "customer sets" comprising at least one tracklet each, and metadata for each customer set. The metadata are derived by the server 520 and relate to the actions of the single customer represented by the customer set. The tracking-related metadata categories may include the customer's location at any time, the time at which the customer entered any particular transaction state, the length of time the customer spent in that transaction state, and/or the time at which the customer departed that transaction state. It should be clear that any other metadata derivable from the dataset may be stored in the system.

Additionally, the descriptors generated by the processor 510 can include the two-dimensional colour image received from the colour sensors 106. However, transmitting and/or storing the image may present privacy concerns. Thus, the processor 510 can be configured to simply compute a mathematical representation of the image. This mathematical representation can be transmitted and stored as part of the descriptor, and the image itself can be deleted. Converting the image to a mathematical representation can thus anonymize the data stored, depending on the mathematical representation used.

Additionally, it should be apparent that the system 500 can be configured with as many colour sensors 106 as necessary to cover the desired area. Three colour sensors 106 are shown in FIG. 5, for convenience; however, for some outlet configurations, only one colour sensor 106 may be needed. Likewise, other outlet configurations may require more than three.

It should also be clear that the processor 510 and the server 520 may be remote from each other and linked via a communications network, such as the Internet. Depending on a user's requirements, however, they may also be directly linked together. Likewise, each server may comprise many linked server units, and/or may be in communication with multiple processors at any one time. For instance, a flagship or headquarters outlet, in some industries, may have a primary server on-site that communicates directly with an on-site processor, as well as remotely with multiple off-site processors. Alternatively, one remote server may communicate with multiple processors, and the processors may further be remote from each other.

For clarity, detection of individuals, and isolation of individuals' images, is performed by the processor 510. The server 520 performs more advanced image analysis, and image grouping functions.

Detection and Descriptor Generation

The processor 510 detects individual customers and isolates their images from image frames. This can be done by using pattern recognition techniques that detect people in still images. Deep learning techniques can be used to implement people detection as well as other machine learning techniques such as cascade of weak classifiers, random trees, and/or support vector machines. While generic people detectors can be used, other technologies that rely on the detection of human body parts can be used in the detection of people. For example, detectors focused on head detection, or head-and-shoulder detection may be used. The present invention preferably detects customers by isolating heads and shoulders of people from still image frames. These body parts are less frequently occluded in images of crowded service areas than whole-body or lower-body parts.

In one embodiment of the invention, the heads of individuals are isolated in image frames by using deep learning methods. Pattern recognition is done by a deep learning software detector, trained on data set including thousands of images of customers' heads. The detector is thus able to identify colour and shape patterns that correspond to human heads with a high level of reliability. The location of a head is characterized by its location in the two-dimensional colour frame, and by defining, for instance, a two-dimensional bounding box that circumscribes the head. In some cases, the positions of an individual's shoulders may also be identified by the detector.

It is also possible to infer one body part from the detection of another. For example, a detector that focuses on the identification of the location of human heads within a still image can be used to infer an individual's torso location and/or full body relative location in the image.

In the preferred configuration of the present invention, the colour sensors 106 are arranged so that customers' heads and torsos are fully visible in most cases. Thus, the customers' heads and torsos can be used for calculating appearance descriptors for each individual. More specifically, the processor 510 determines a rectangular bounding box that circumscribes the customer's head, and a second rectangular bounding box that circumscribes the customer's torso and/or body. The processor 510 then crops the image frame so as to include both the customer-head-bounding box and the customer-torso- and/or-body-bounding box, thus isolating the individual customer from the image frame.

Each individual customer's image is assigned the same time-stamp that was given to the image frame from which it was extracted. Additionally, each individual customer's image is assigned a camera identifier label, to indicate which colour sensor captured the source image frame. Further, the coordinates of both the customer's head and the customer's torso within the individual customer's image are also specified. Additionally, each individual customer's image is assigned a sequence number to uniquely identify images isolated from the same image frame. The customer's position is the two-dimensional coordinates of the isolated customer image within the overall image frame.

Figure 6:
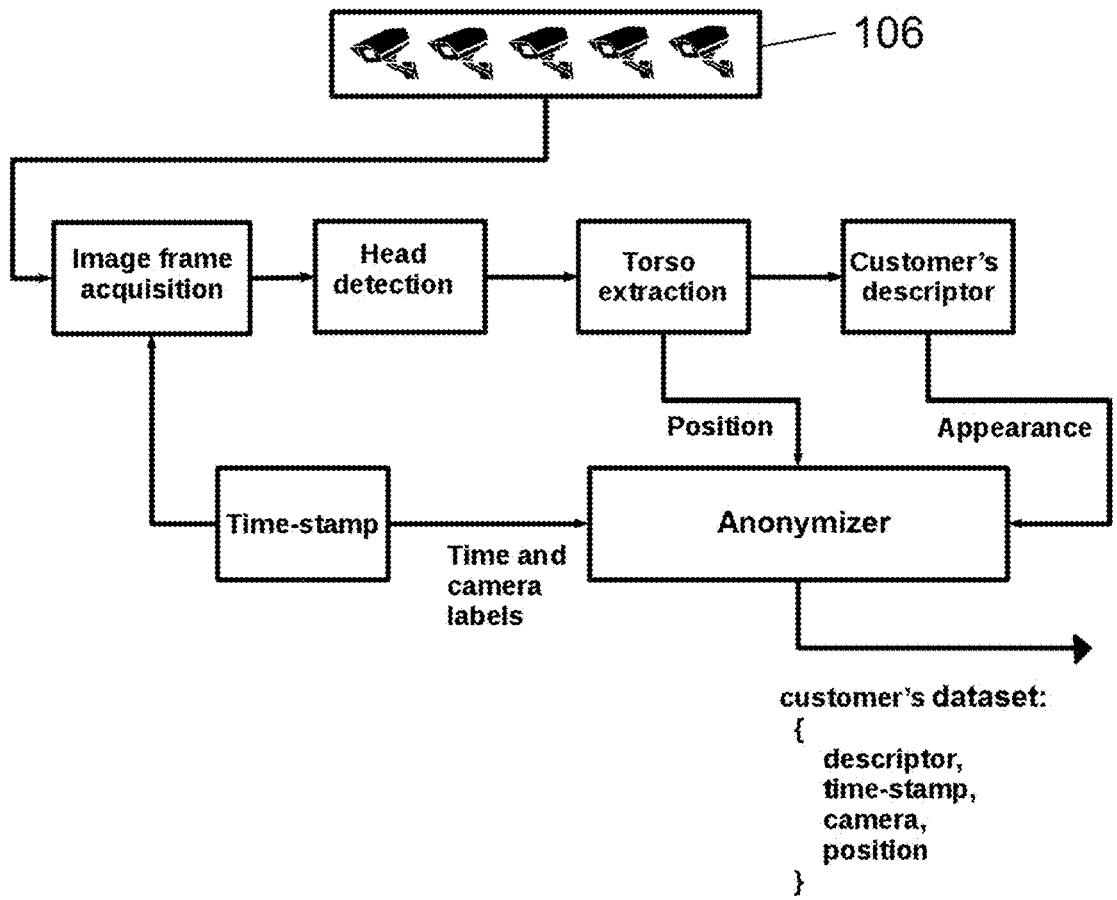
FIG. 6 outlines a detection method according to an embodiment of the invention.

FIG. 6 illustrates a detection method according to one embodiment of the present invention. Multiple colour sensors 106 transmit image frames to the processor 510 at regular time intervals. The colour sensors 106 additionally pass time information for each image frame to the processor 510. Each image frame is processed to detect and isolate individuals' images, using head and torso extraction methods. Each isolated customer image is then used to generate a descriptor D that uniquely defines the customer's appearance, the customer's location, and the time of the image. As discussed above, the descriptor D may be anonymized or may contain raw image data. The descriptor D can then be sent to a server for further processing.

In one embodiment of the invention, the image frames captured by from the colour sensors 106 are formatted in RGB colour space. The individual customer images extracted from these frames are thus also formatted in RGB colour space. Other colour spaces may be used for the source image frame, depending on the particular colour sensors installed in any given implementation. However, depending on the colour space used, the cropped images may need to be converted into a colour space that facilitates calculating mathematical descriptors.

The descriptor D can be a composite of visual features such as: pose with respect to the camera; the encoded texture of the customer's garment as a colour histogram; and/or other texture models, body shape, or skin tonality and/or ethnicity variables. Alternatively, the customer's descriptor D can be a multidimensional array of numbers that encodes structural and visual elements of each customer as they appear in each image frame at a given time.

In another embodiment, the customer's descriptor D can be created by the so-called "deep features" learned from a "deep network" (which may be a neural network), such as the deep network that may be used to isolate customers' image from the overall image frames.

In a preferred embodiment, however, the customer's descriptor D is a normalized colour histogram of customer's head and torso. Each histogram calculates the frequency at which certain colour ranges appear in target regions of the customer's image. For representative examples of how to implement this approach, see, e.g., Bazzani, Cristani, & Murino, "Symmetry-Driven Accumulation of Local Features for Human Characterization and Re-identification", *Computer Vision and Image Understanding* (*CVIU*), 2013; and Liao et al., "Person Re-identification by Local Maximal Occurrence Representation and Metric Learning", 8*th International Congress on Image and Signal Processing* (*CISP*), October 2015.

Each histogram can then be represented as a numeric vector that characterizes the customer's appearance. There are no size limits on this "customer-descriptor vector" D. A customer-descriptor vector D can be composed of several hundred numbers, or more, depending on the implementation. By comparing a single customer-descriptor vector with other customer-descriptor vectors, it is possible to compare customer images and determine if two images are images of the same customer. A comparison metric is applied to the two vectors. In one implementation, if the result of the comparison metric is a large value, it can be concluded that the two images are of different customers. If this value is very small, then the two images must represent the same customer. (Of course, many other comparison metrics may be applied.)

It should be noted that reconstructing an individual's exact image from these customer descriptors would not be possible. Thus, the customer's image can be securely anonymized while nevertheless retaining enough information for relatively accurate matching and tracking.

Calculating colour histograms of the customers' images without removing the background may introduce noise. This noise can be reduced by applying a weighting function that favors pixels at the center of the estimated location of the head and torso, while restricting the counting of pixels away from the center. In one embodiment, Gaussian functions centered on the central axes of each target region are used to implement the histogram weighting. In another embodiment, segmentation methods can be used to classify each pixel of the customer image as belonging to the customer or to the background. Background pixels can then be ignored when computing the descriptor.

Once the descriptor has been calculated and anonymized (if desired), various pieces of information related to the image are combined into a "dataset" to be passed to the server. The dataset typically includes the image descriptor; a time-stamp for the image; a camera identifier (in configurations using more than one colour sensor); and the individual's position information as derived from the image.

Figure 7:
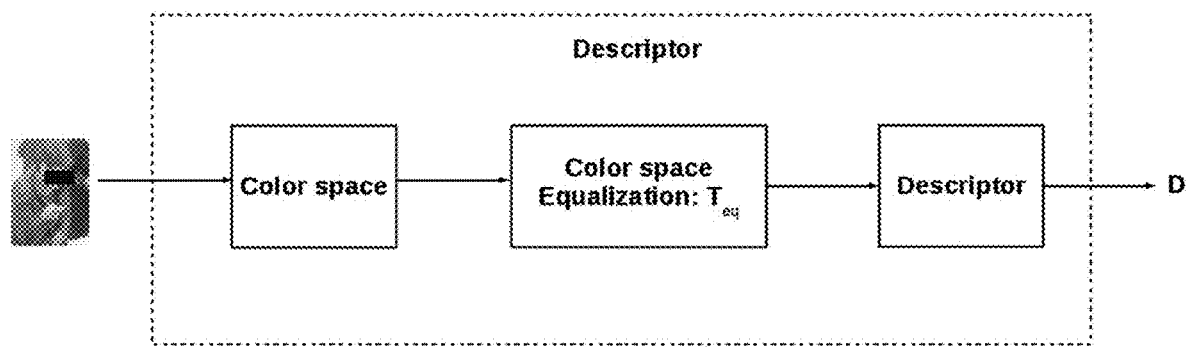
FIG. 7 outlines a colour-equalization process used in one embodiment of the invention.

Notably, due to differences in position or model, different colour sensors may produce images of the same scene that have different colour values. Additionally, cameras used for image capture can be configured to adjust their white balancing and acquisition parameters automatically. Automatic adjustment produces image frames that, though possibly optimized for perspective, are nevertheless potentially unequal. This could result in image frames with differing luma and colour (hue and saturation) values, and thus in the misidentification of individuals. To reduce the likelihood of error, therefore, the present invention includes a mechanism for equalizing colour values between images captured by different cameras. This process is shown schematically in FIG. 7.

First, if necessary, the colour space of the source image is transformed into a space that can be represented mathematically. Then, a transfer function $T_{eq}$ is applied to the colour image in the chosen colour space to minimize discrepancies potentially resulting from different cameras. For example, $T_{eq}$ can be a transformation that equalizes the mean component of each colour channel of the source images to a chosen value. Then, the image is converted to a multidimensional vector D to model the customer's appearance.

Individual Tracking

The present invention can track individual customers' motions and the length of time each customer spends in each transaction state, allowing management and efficiency experts to work with accurate and anonymized customer service data.

The tracking aspect of the invention is implemented by the server (520 in FIG. 5). The server receives new datasets from the processor and compares them to datasets already stored in the database 530.

Preferably, the server compares a given dataset to other datasets in the "active list". The "active list" defines the datasets to be compared at any one time. As may be imagined, there will typically be many more datasets available in the database than there are customers in the outlet, even at peak sales hours. Comparing a dataset with each other dataset in the database would therefore be a time- and energy-intensive process. Moreover, that complete comparison (for instance, comparing a current instant with data gathered several months previously) would not yield useful information regarding the flow of individual transactions. As a result, the "active list" is limited (generally by reference to image time-stamps) to reduce the number and complexity of the comparison process.

To limit the active list, the server assigns a "first time of appearance", $t_{i,0}$, to the tracklet i, equal to the time-stamp of the first instance of that tracklet. Similarly, the system assigns a last time of appearance for any given tracklet i, $t_{i,l}$. The method will compare $t_{i,l}$ with the current time t to compute the time a given tracklet has been in the active list, $T_i$. When $T_i$ for the given tracklet is larger than a time-out limit for being in the active list ($T_{act}$), the system attempts to merge that tracklet with all the other tracklets in the active list before removing it from that list. Additionally, as different transaction states and areas may have different rates of flow, the system can assign different $T_{act}$ thresholds to different states of the transaction and/or different monitored areas.

To compare a given dataset to another, in one embodiment of the invention, an appearance-similarity score is calculated for the dataset pair based only on the descriptors the datasets contain. In another embodiment of the tracking system, a more thorough comparison is done by correlating appearance-similarity, location, and acquisition time simultaneously, in order to find the best match within the active list of candidates.

For instance, if A and B are two instances of the same customer with very similar customer images, the 'distance' between their two customer-descriptor vectors would be close to zero (using a comparison metric as described above). Similarly, the greater the differences between A and B, the larger the distance between their customer-descriptor vectors. Finally, if A and B are different customers, the distance between the customer-descriptor vectors would be a number noticeably larger than the one obtained by comparing two customers that are visually similar.

Effective comparison using this distance computation involves defining a similarity threshold value $T_s$. For example, customers A and B would be considered similar if the distance is below or equal to $T_s$, and they would be considered dissimilar if the distance is larger than $T_s$.

The trivial situation is "true positive" matching and "true negative" matching when a similarity check leads to correct identification of similar or dissimilar customers. In other embodiments, the distance may represent a rank of similarity where the minimum acceptable value is $T_s$; in those embodiments, a distance larger or equal to $T_s$ would imply similarity matching. Distances smaller than $T_s$ would indicate a failure to match.

This distance-computation approach to similarity comparison may be erroneous when two different customers are closely similar. For example, two customers in the monitored area could be wearing the same outfit. In this case, the comparison would produce a false positive matching, as the colour histograms of the compared customers would be highly similar. In addition to false positive matchings, this approach may also result in false negatives. For example, sudden changes of a customer's pose may produce images whose colour histograms differ enough to be treated as different customers.

When a match is found between a new dataset and a pre-existing dataset in the active list, the new dataset is linked to the pre-existing dataset, joining a pre-existing "tracklet". If no match is found, a new tracklet is created to hold that dataset.

Figure 8:
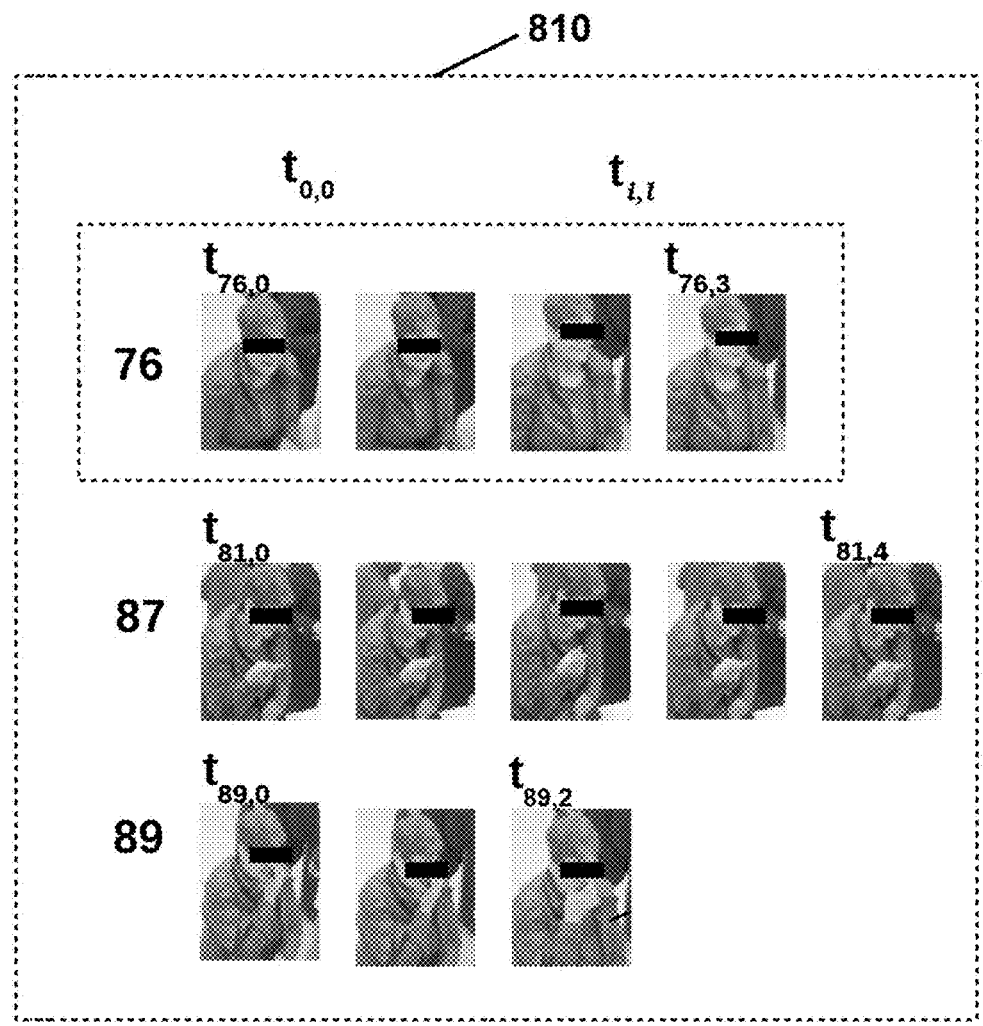
FIG. 8 illustrates a customer set according to one embodiment of the invention, including datasets and tracklets.

Datasets can also be referred to as "instances" of the associated tracklet, and are sequentially numbered based on the order of their addition to that tracklet. Tracklets are numbered sequentially based on the first instance of the tracklet. Thus, tracklet instances (datasets) can be denoted $t_{i,l}$ where i is the tracklet number and l is the most recent dataset in tracklet i. For greater clarity, FIG. 8 shows a customer set 810 containing three tracklets 76, 87, and 89. The first dataset in the tracklet 76 is referenced as $t_{76,0}$; the last dataset in that tracklet can be denoted $t_{76,3}$.

It should be noted that the thumbnail images shown in FIG. 8 are merely representative. As discussed above, the actual dataset typically contains multiple pieces of data, and is not required to contain any part of the source image itself.

Figure 9:
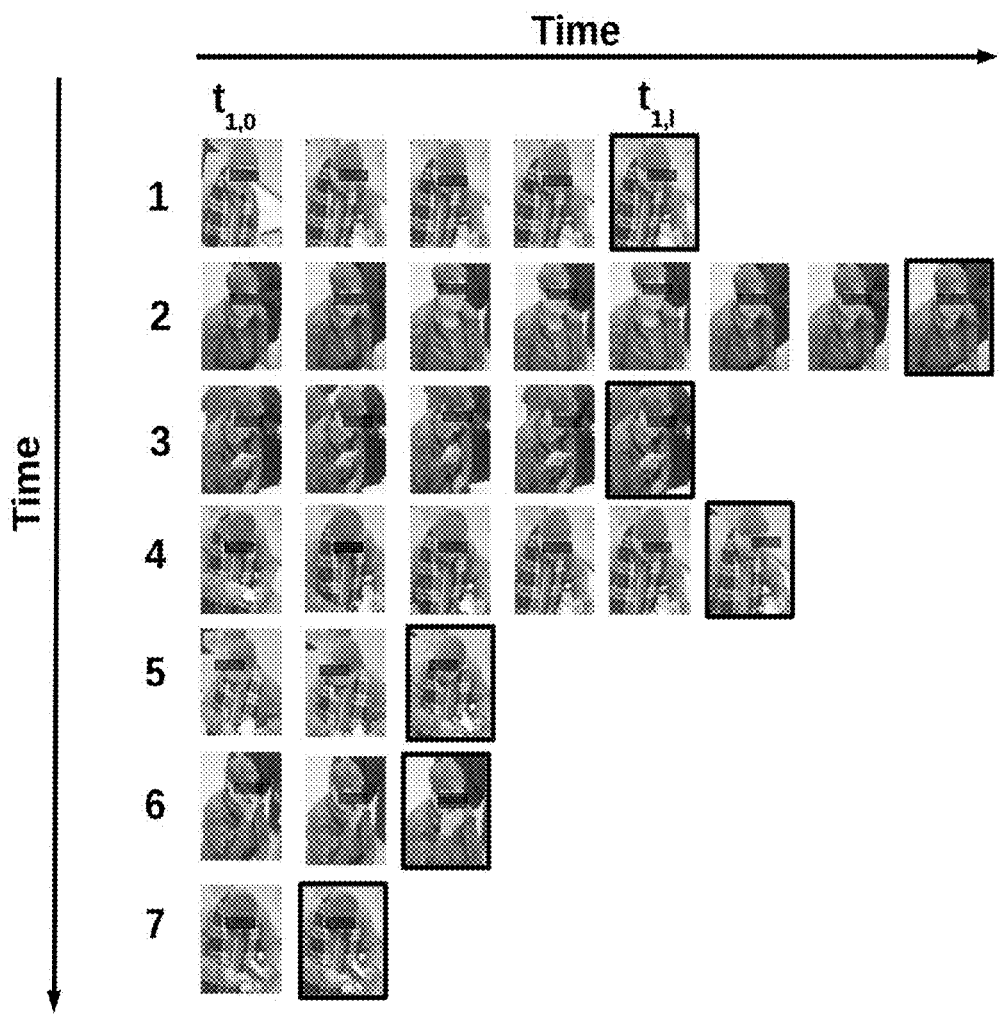
FIG. 9 illustrates tracklet formation through the addition of datasets.

FIG. 9, similarly, shows tracklets as they are sequentially built by the system. Each row of images 1 to 7 represents a tracklet, and each tracklet may be built as a linked chain of datasets, represented in this figure by thumbnail images. The linked-chain or linked list embodiment should not be taken as limiting the scope of the invention; tracklets may be linked or grouped using any effective structure.

Unlike those in FIG. 8, the tracklets in FIG. 9 have not yet been merged, and thus they appear consecutively and do not all refer to the same individual. As can be seen, tracklets 1, 4, 5, and 7 reference a single customer, but are interspersed with those pointing to another customer (tracklets 2, 3, and 6).

FIG. 9 also shows the fragmentation of tracklets of the same customer when the pose with respect to the camera changes over time. In this event, the same customer originates several tracklets, where each tracklet contains highly similar datasets.

Figure 10:
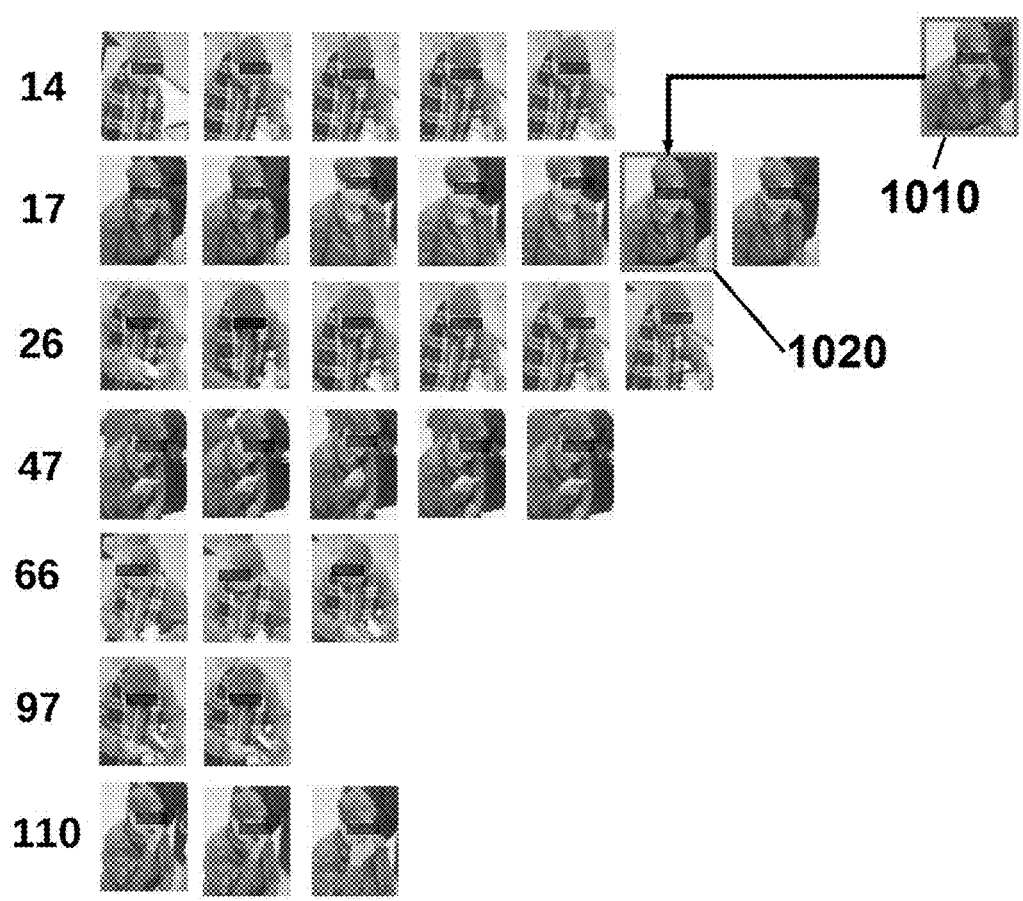
FIG. 10 illustrates dataset matching using an appearance-similarity analysis, according to one embodiment of the invention.

FIG. 10 shows an example of tracking by similarity in which a new dataset 1010 is added to a tracklet (in this case tracklet 17) by comparing its descriptor to the descriptors of all the instances of all the tracklets in the active list.

The similarity check may fail to identify a customer as 'true-negative' (that is, as a new customer) by incorrectly matching the new dataset with an instance in a tracklet from another customer. The incorrectly linked customer is considered a tracking error, which can produce further errors if only similarity is checked to re-identify customers. This type of tracking error can propagate when a later customer's dataset of the incorrectly linked customer appears and is matched by similarity to the incorrect instance.

To mitigate this source of error, some embodiments of the invention may use a proximity check as well as the appearance-similarity comparison. The proximity check, based on location and time information from the dataset, may be run before, after, or simultaneously with the appearance-similarity check, and compares a new dataset and the last instance of each of the active tracklets. The spatial overlapping is done by intersecting the bounding boxes defined in the new dataset and the bounding boxes of the compared instances. Temporal proximity is checked by comparing the time-stamps in the new dataset against the time-stamps of the compared instances (the most recent appearance of each customer tracked by each tracklet). Finally, the appearance-similarity is checked using the same metric described above; however, in this case the threshold of similarity is not as restrictive as in the one used in the similarity test.

Figure 11:
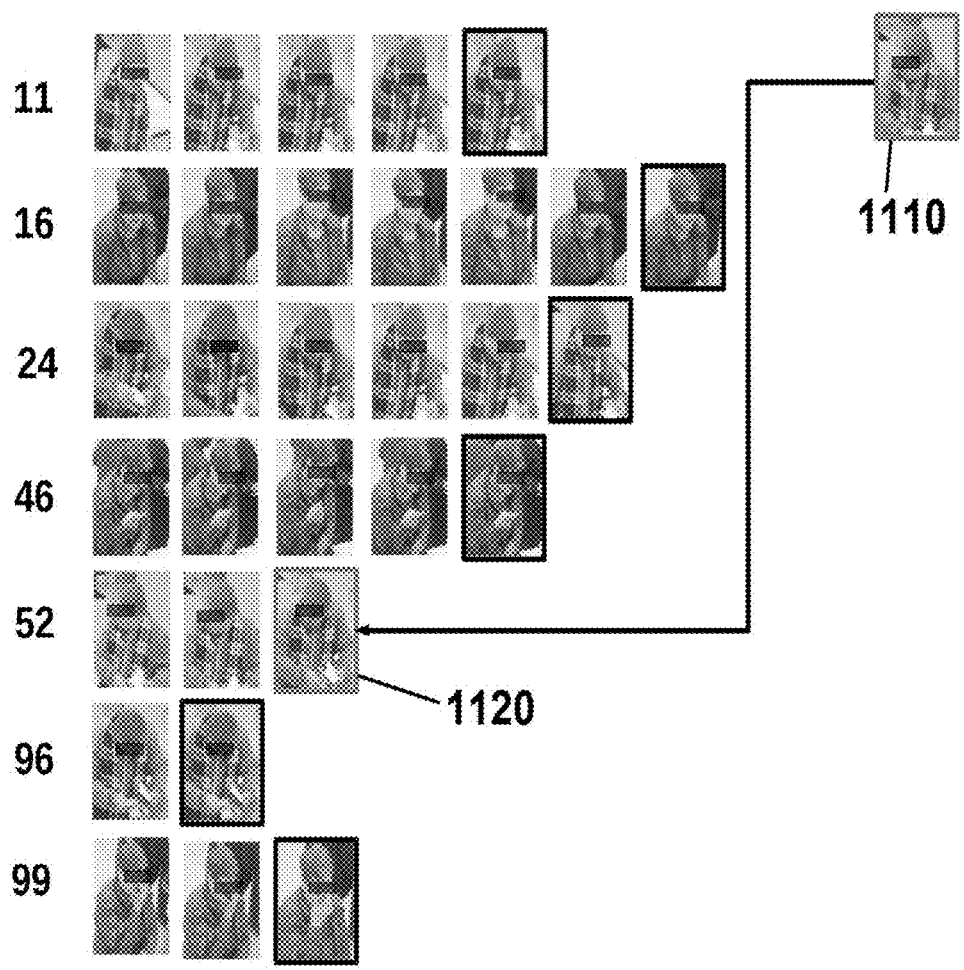
FIG. 11 illustrates dataset matching using a proximity test, according to one embodiment of the invention.

FIG. 11 shows an example of tracking by proximity in which a new dataset 1110 is added to a tracklet (in this case tracklet 52) by comparing its descriptor, time-stamp, and location in its originating image frame, against the most recent instances of all the tracklets in the active list. The best match found in this case is dataset 1120.

In practice, scoring methods and similarity thresholds can be chosen to minimize the chance of propagation of tracking errors. For example, similarity thresholds can be decreased to minimize the occurrence of false positive matches at the price of creating multiple tracklets associated with the same customer.

After tracklets are established, several tracklets may be merged together to form customer sets. The system merges the tracklets in the active list to create customer sets composed by multiple tracklets (linked customer's datasets) that can be used to recover information of the location and duration of each state in the service transaction for any given customer. Initially, all tracklets are considered customer sets of one tracklet each. As tracking time elapses, the system will group these small customer sets to produce larger sets of tracklets, which are new sets representing single customers isolated from one or different video sources. Merging is a three-stage process involving a compatibility analysis before a similarity check (similar to the similarity check performed on datasets to form tracklets), before the merging itself.

A customer sets remains in the active list, meaning that it can be merged with other customer sets in the active list, as long as the most recent $t_{i,l}$ from all its constituent tracklets is not older than the maximum allowed time in the active list $T_{act}$.

A merging event is triggered each time a customer set is about to leave the active list. In the event of merging, the customer set to be merged can be called the "destination set" and the set with which it is to be merged can be called the "candidate set".

The merging of destination and candidate sets is done by first checking for compatibility between the sets. In one embodiment of the invention, compatibility is tested by verifying that no two tracklets between the sets contain instances from the same image frame and camera. This check rests on the fact that if two different tracklets contain datasets from the same camera and image frame, the datasets must have been isolated from different customers, and therefore should not be merged. Alternatively, compatibility can be tested by comparing the spatial and temporal correlation between all instances from candidate and destination sets. For example, when two instances have a large spatial difference (two distinctive locations in the same video source) and very close time-stamps, they must belong to different isolated customers. This compatibility test phase eliminates candidate sets that are likely from entirely different customers (as merging is intended to group together fragmented representations of the same isolated customer).

Then, for each compatible candidate, the merging system computes the number of similarity matches between all instances of all tracklets from the destination and all instances from the candidate set. This can be done by, for example, computing the percentage of instances of each tracklet in the destination customer set that form matching pairs with instances from any tracklet in the candidate set. If the number of matching pairs of instances is above a threshold $T_{merge}$, then that particular tracklet has a match in the candidate set. The similarity comparison between two instances can be done using any of the similarity tests described above. For example, similarity may be calculated based on similarity in appearance, location and time of acquisition, with thresholds defined to minimize the chance of wrongly merging tracklets from different customers, while maximizing the chance of successfully merging tracklets from the same customer.

The number of matching pairs between each set of tracklets will lead to a percentage of tracklets that belong to the destination set and are similar to the candidate set.

To improve resilience to errors, the merging system can repeat the computation of similarity described above, but this time between all the instances of all the tracklets of the candidate set with respect to the destination set. This test returns the percentage of tracklets that belong to a candidate set and are similar to the destination set.

The merging process then uses the computation of both percentages to merge a destination set with candidate set. For example, the merging system can define a threshold of tolerable similarity ($T_{merge}$) to merge two customer sets. Using this threshold, the process would merge sets if the similarity percentages of either the destination-to-candidate or the candidate-to-destination test is above $T_{merge}$.

After merging of the destination set and a compatible candidate, the time in the active list ($t_{i,l}$) after merging is updated to match the most recent instance of the candidate customer set. This event prolongs the 'life' of the customer set in the active list as long as the difference between the actual time and $t_{i,l}$ does not exceed $T_{act}$.

If the tracking system could not find a candidate customer set to merge with a destination set, the destination customer's set will be removed from the active list, and tracking will finish for the customer represented by the removed set.

Another embodiment of the invention computes a similarity value between all the instances of all the tracklets that belong to a destination set and to candidate sets. In this embodiment, the system can use a classifier network trained to identify matches between large sets of descriptors. This classifier network can be used to determine if a customer set is similar to another, or to find the similarity rank between customer sets. Additionally, this approach can be used by the merging system to combine destination and candidate sets into a new customer set.

Further, when a customer set is removed from the active list, its set size will be evaluated as the sum of instances within all of its component tracklets. If the customer set size is below a minimum size threshold ($T_{size}$), that customer set is labeled as 'outlier', so that it will not be used for analytics extraction. However, if the size of the removed customer set is larger than $T_{size}$, it will be considered as representing a valid customer and will be added to the list of customers detected in the monitored area which will be used by the system to extract time analytics.

One embodiment of the invention merges (or attempts to merge) all customer sets originating in the same camera first (intra-camera merging), and only then merges customers sets that originate in different cameras (inter-camera merging). The compatibility check performed before inter-camera merging may consider all candidates originating in different cameras as potential candidates for merging. Another embodiment of the invention can consider the spatial and temporal correlation between instances from different cameras as a means of eliminating unlikely candidates. Given that the colour equalization is applied in the detection step, similarity between customer sets can be tested by defining a proper threshold to enable more tolerance in appearance variation than was allowed when merging tracklets by similarity.

Figure 12:
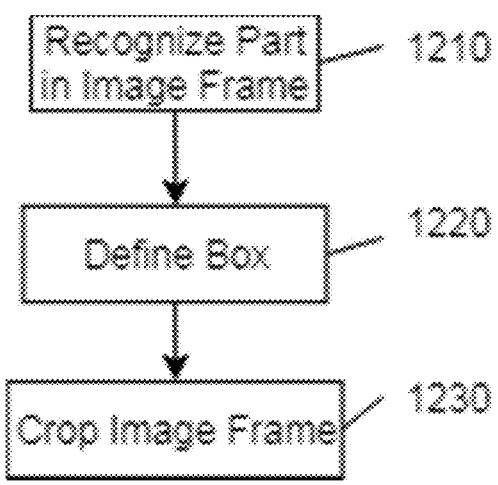
FIG. 12 is a flowchart outlining a detection method according to another embodiment of the invention.

FIG. 12 is a flowchart outlining a method for individual detection from an image frame, according to one embodiment of the invention. At step 1210, at least a part of the individual is recognized and detected. As discussed above, this part can be a head, a torso, or a combination thereof. A deep learning tool, such as a neural network, can be used to scan images for recognized pattern data.

Once the part of the individual is recognized, a boundary box is defined around that part (step 1220). Next, the overall image frame is cropped to the boundary box (step 1230), isolating the individual's image.

Figure 13:
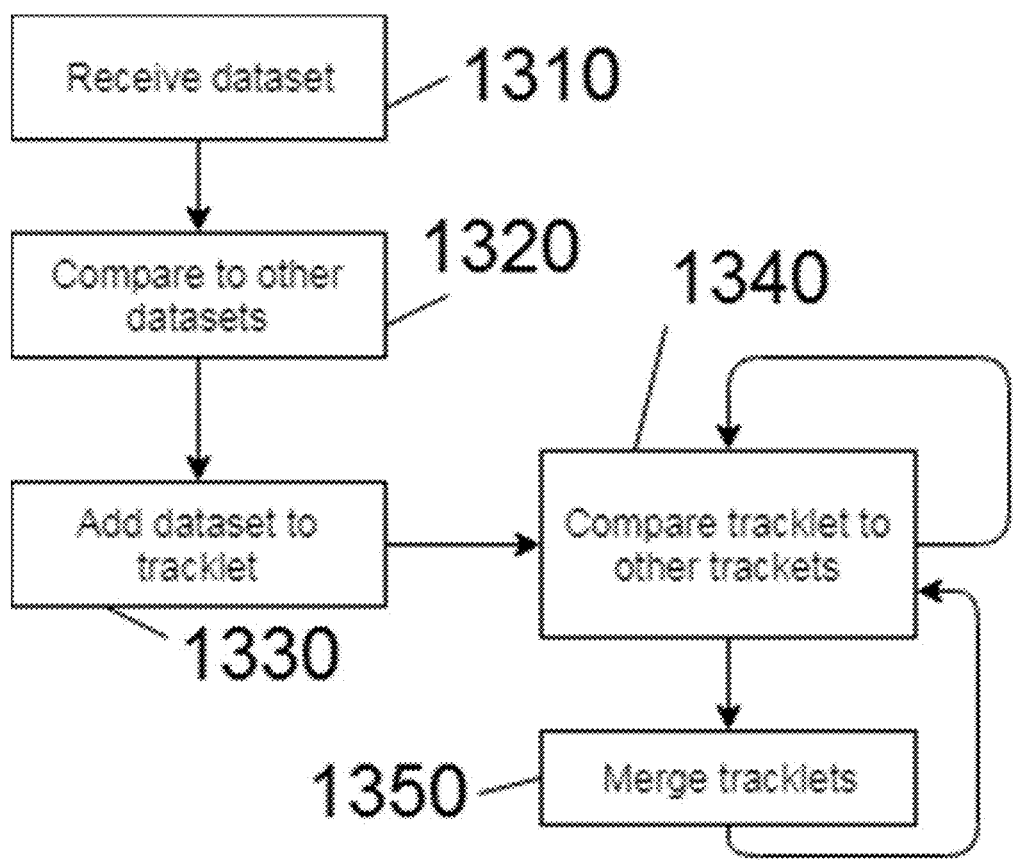
FIG. 13 is a flowchart outlining a tracking and merging method according to one embodiment of the invention.

FIG. 13 is another flowchart, detailing a tracking and merging method of one embodiment of the invention. In the first step, 1310, a new dataset is received from a processor. The new dataset is then compared to other datasets already in the database (at step 1320). As discussed in detail above, that comparison may include a calculation of appearance-similarity and/or proximity-based similarity.

When a match for the new dataset is found, that new dataset is added to the matching tracklet group (step 1330), according to the pre-existing tracklet structure (for instance, as an entry in a linked list, $t_{i,j}$). As above, again, if no match is found, the new dataset is considered to form the start of a new tracklet i.

At step 1340, tracklets are compared to each other, for the purpose of combining them into larger groups known as customer sets. This comparison process is iterative and does not depend on receiving data. Rather, it depends on elapsed time.

The tracklet comparison can use any of the similarity techniques already discussed. Additionally, a compatibility check can be performed before mathematical similarity analysis. After comparison, the tracklets are merged together if possible (step 1350). If no match is found, the tracklet forms the start of a new customer set.

In one embodiment of the system of the present invention, the tracking-related metadata include at least one of: a customer location; an entrance of said individual to a tracked state; a length of time said individual is in said tracked state; and a departure of said individual from said tracked state. Additionally, in another embodiment of the system of the present invention, the tracked state is at least one of: entering a service area; waiting in a line; moving in said line; moving to a service counter; placing an order; paying for said order; leaving said service counter without being served; moving away from said service counter; moving to a pickup area to wait for the order; waiting for said order away from said pickup area; moving towards said pickup area; moving away from said pickup area; moving to said pickup area when said order is ready; picking up said order; moving away from said pickup area with said order; and moving away from said service area after being served.

In other embodiments of the system, the similarity score is based on both an appearance-similarity score based on the descriptor, and a proximity score based on the location information and the time information in the dataset. As well, in some embodiments of the system, the descriptor includes a sequence number related to the image frame. The location information in the descriptor, in some embodiments of the system, includes two-dimensional coordinates for said at least one individual, based on a position of said image within said image frame. In other embodiments of the system, the time information in the descriptor is a timestamp denoting when said image frame was captured.

In some embodiments of the system including at least one camera, said at least one camera captures said image frames at regular time intervals. Additionally, in some embodiments, said at least one camera transmits time information for each of said image frames to said processor. As well, in some such embodiments, the dataset includes a camera identifier for said at least one camera.

Further, in one embodiment of the system, the mathematical representation is a colour histogram. In one such embodiment, the server compares bin values from said colour histogram to bin values from another image's colour histogram, to calculate the similarity score. In particular, in one such embodiment, the server calculates an absolute difference of bin values from said colour histogram and bin values from another image's colour histogram, to calculate said similarity score.

In one embodiment of the method for isolating an individual's image from an image frame, the method further comprises the step of storing each cropped image resulting from step (c). In another embodiment of this method, where the part includes a torso, the method further comprises the step of deriving position information from said torso. In another embodiment of the method, where a descriptor is generated, the descriptor includes a colour histogram.

Additionally, in one embodiment of the method for tracking an individual between multiple image frames, the descriptor and each of said other image descriptors comprise a colour histogram. In a related embodiment of that method, a similarity score is based on bin values from each colour histogram. In particular, in one embodiment, the similarity score is an absolute difference of bin values from each colour histogram. Further, in some embodiments of this method, the tracking-related metadata include at least one of: a customer location; an entrance time of said individual to a tracked state; a length of time said individual is in said tracked state; and a departure time of said individual from said tracked state. In another embodiment of this method, the tracked state is at least one of: entering a service area; waiting in a line; moving in said line; moving to a service counter; placing an order; paying for said order; leaving said service counter without being served; moving away from said service counter; moving to a pickup area to wait for the order; waiting for said order away from said pickup area; moving towards said pickup area; moving away from said pickup area; moving to said pickup area when said order is ready; picking up said order; moving away from said pickup area with said order; and moving away from said service area after being served.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for detecting individuals within image frames and tracking individuals between said image frames, said system comprising:
processing circuitry, said processing circuitry being configured to receive an image frame; a server; and
a database, said database storing datasets, tracklets, and customer sets related to said individuals, each of said tracklets comprising at least one dataset, and each of said customer sets comprising at least one tracklet, and said database also storing metadata related to said individuals,
wherein said processing circuitry is further configured to process said image frame and to is olate at least one individual's image from said image frame,
and wherein said processing circuitry is further configured to generate a descriptor for said at least one individual's image,
and wherein said server receives a specific dataset including said descriptor and compares said specific dataset to a plurality of other datasets, said plurality of other datasets being comprised in a plurality of tracklets and each of said plurality of tracklets being designated as being in an active list, wherein said active list is managed as follows:
for each tracklet:
adding said tracklet to said active list at a first appearance of said tracklet;
assigning a time of last appearance to said tracklet, said time of last appearance corresponding to the last time an image of an individual represented by said tracklet was isolated;
determining an active list time for said tracklet based on a subtraction of said last time of appearance from a current time;
comparing said active list time to a limit time;
when said active list time is larger than said limit time, executing a merging step to merge said tracklet with another tracklet in said active list; and
when said merging step is unsuccessful, removing said tracklet from said active list,
and wherein said server calculates a similarity score between said dataset and each of said plurality of other datasets, producing a plurality of similarity scores.

2. The system of claim 1, wherein one of said plurality of similarity scores meets a threshold and said dataset is added to a tracklet related to said one of said plurality of similarity scores.

3. The system of claim 1, wherein none of said similarity scores meet a threshold and a new tracklet is created to contain said dataset.

4. The system of claim 1, wherein said server further calculates a tracklet similarity between a pair of tracklets, and wherein said server merges said pair of tracklets to thereby produce a customer set when said tracklet similarity meets a threshold.

5. The system of claim 4, wherein said server calculates tracking-related metadata based on said customer set.

6. The system of claim 1, wherein said dataset comprises said descriptor, location information for said image, and time information for said image frame.

7. The system of claim 6, wherein said similarity score is based on at least one of an appearance-similarity score based on said descriptor, and a proximity score based on said location information and said time information.

8. The system of claim 1, wherein said descriptor includes a mathematical representation of said image.

9. The system of claim 1, further comprising at least one camera, said at least one camera capturing said image frames and transmitting said image frames to said processing circuitry.

10. The system of claim 1, wherein said server dynamically removes a background from said individual's image.

* * * * *